United States Patent [19]

Eigenmann

[11] 4,416,510

[45] * Nov. 22, 1983

[54] RETROREFLECTIVE STRUCTURE AND METHOD OF MANUFACTURING THE SAME

[76] Inventor: Ludwig Eigenmann, Vacallo, Switzerland

[*] Notice: The portion of the term of this patent subsequent to Feb. 7, 1995 has been disclaimed.

[21] Appl. No.: 235,141

[22] Filed: Feb. 17, 1981

Related U.S. Application Data

[63] Continuation of Ser. No. 6,503, Jan. 25, 1979, abandoned.

[30] Foreign Application Priority Data

Jan. 31, 1978 [IT] Italy ............................... 19827 A/78

[51] Int. Cl.³ .......................................... G02B 5/128
[52] U.S. Cl. .................................................. 350/106
[58] Field of Search ....................... 350/104, 105, 106

[56] References Cited

U.S. PATENT DOCUMENTS

| | | | |
|---|---|---|---|
| 2,243,434 | 5/1941 | Menke | 350/106 |
| 3,155,764 | 11/1964 | Gill | 350/106 |
| 4,069,281 | 1/1978 | Eigenmann | 350/105 |
| 4,072,403 | 2/1978 | Eigenmann | 350/105 |
| 4,108,536 | 8/1978 | Eigenmann | 350/105 |

FOREIGN PATENT DOCUMENTS

| | | | |
|---|---|---|---|
| 595662 | 12/1947 | United Kingdom | 350/106 |
| 1443618 | 7/1976 | United Kingdom | 350/105 |

*Primary Examiner*—R. A. Rosenberger
*Attorney, Agent, or Firm*—Michael J. Striker

[57] ABSTRACT

An improved retroreflective structure designed to be associated to a roadway pavement principally for improving nighttime visibility of traffing regulating signs and areas, formed from selectively dividing a primary calandered and printed material, the structure including interconnected and cooperating retroreflectore arranged for defining said signs and areas.

20 Claims, 11 Drawing Figures

RETROREFLECTIVE STRUCTURE AND METHOD OF MANUFACTURING THE SAME

This is a continuation of application Ser. No. 6,503, filed Jan. 25, 1979, now abandoned.

BACKGROUND OF THE INVENTION

The prior art has been described in a wide patent literature a great part of which has been provided by the present applicant as briefly follows. This art is a well worked one and it is concerned with providing a roadway surface with traffic regulating signs, the most of which forms traffic lane dividing lines, roadable areas delimitating lines and other marks. Such sign can be formed on or applied to the road pavement in a variety of manners. For example, the marking can be painted on the pavement surface, or by applying thereto various means.

A manner of interest comprises laying on and securing to the roadway pavement a strip or tape of prefabricated material. This material advantageously preferably has reflective elements secured thereto for improving nighttime visibility and/or coarse surface forming granular or microgranular mineral substances, such as sand or crystalline particles, quartz, curundum or other for anti-skid property of the marked areas.

Another manner of interest comprises laying reflective elements for improving nighttime visibility on a painted pavement.

Among the closest prior art reference is herein made to the U.S. Pat. No. 4,108,536 where elongated retroreflective elements have been set forth, to the U.S. Pat. No. 4,072,403 wherein an advantageous vertically asymmetrical reflective element has been detailedly described, and U.S. Pat. No. 4,069,281 where a manner for providing a preliminarily prepared roadway pavement with retroreflective elements of the above character has been illustrated. In the various Figures of the latter reference there is indicated that and how said retroreflective elements are spacedly arranged on the road surface, and in the U.S. Pat. No. 4,072,403 above (FIG. 5 and following) an advantageous manner for forming and making retroreflective such elements has been set forth.

All above U.S. patents to the present applicant can be assumed to be incorporated in this disclosure and therefore other comment and further analysis of the prior is considered to be unnecessary.

THE OBJECTS OF THE INVENTION

According to the present invention a plurality of retroreflective elements are formed basically by calendering a sheet of thermoformable material (see FIGS. 1 and 4 of U.S. Pat. No. 4,072,403) and by processing the thus elaborated sheet as issued from the counterrotating calandering rollers, as also shown in and described with reference with FIGS. 7 to 10 of same patent publication.

These elaborated and processed preferably but not critically provided as above are then selectively subdivided by breaking the thin sheet (14 or 14', FIGS. 5 and 7 to 10 of the above patent) for providing units or groups adapted to be secured to the suitably prepared roadway surface or to the prefabricated tape material to be applied thereto.

According to another object of the invention, pluralities of elements are such prepared to have elongated such as elliptical configurations in plan view, that is in the plane wherein said elements are to be laid for service on the road.

According to a further object of the invention the elements are formed in the calendered sheet in a quincunx arrangement, and then selectively subdivided to form elongated strips the width of which comprises preferably two or more elemental retroreflective particles. Plural strips thus obtained have been proved to provide a surprising retroreflection even when largedly spaced on the road because the said arrangement provides an uninterrupted line of active reflection.

These and other objects, advantages and features of the invention and the advantages and features thereof will be apparent from the following detailed description of some not limitative embodiments of same invention, taken together with the accompanying drawings.

THE VIEWS OF THE DRAWINGS

FIG. 1 is a perspective, fragmentary and diagrammatical view of the manner of forming by calendering an elaborated sheet of material adapted for selective subdivision;

FIG. 2 and 2A similarly illustrate how single strips including each a plurality of elements may be formed from the elaborated calendered sheet material;

DETAILED DESCRIPTION OF THE PREFERRED EMBODIMENTS

Upon having taken into account the relevant above referred to prior art, this invention can be described in brief. Further, in the following description reference alphanumeric symbols corresponding to those made use of my U.S. Pat. No. 4,072,403 will be made use of for facilitating the comparison with prior art, where possible.

An elaborated sheet S' is calendered between couterrotating calendering rolls 10' and 12' inpressed at the elaborated faces 10b and 12b so that the sheet includes a multiplicity of "prints" interconnected by a brittle thin planar sheet (upon cooling). This thin sheet defines parts where the material can be broken into pieces.

Figure 1:
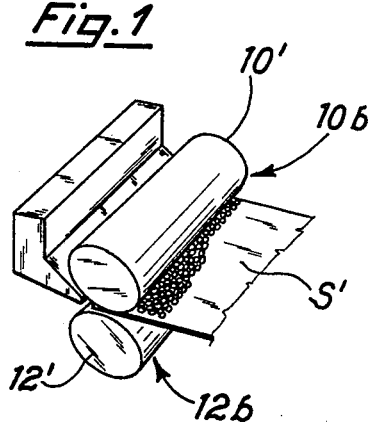
Figure 2:
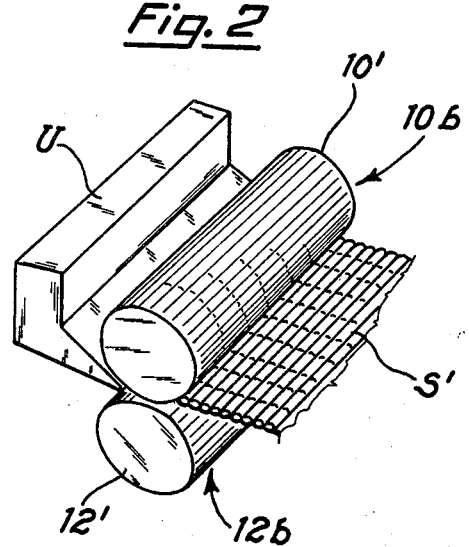
Figure 2A:
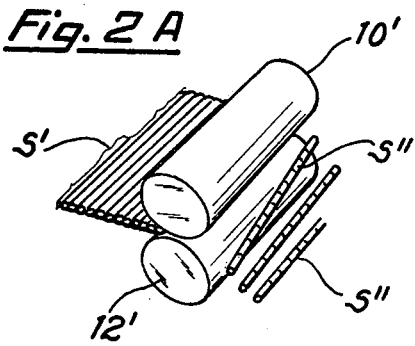
Figure 3:
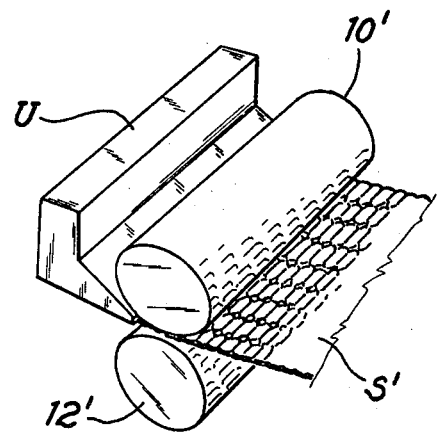
FIGS. 3, 3A and 3B are somewhat modified embodiments.
Figure 3A:
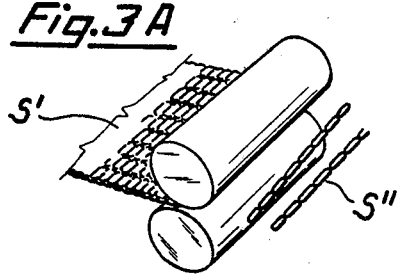
Figure 3B:
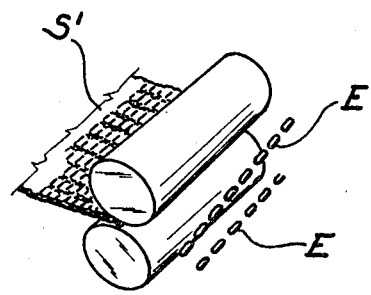

The breaking can be selected at will. For example, strips S" (FIGS. 2A and 3A). Strips S" can be obtained from said sheet. Such strips can be subdivided into individual elements E (FIG. 3B).

Of course, the breaking of the material can be made at random and it may be grossily ground or milled such as in a revolving tumbling barrel or tumbler, or similar roller, until pieces each one of which forms one element can be obtained.

Figure 4:
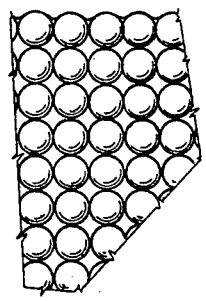
FIGS. 4, 4A and 4B illustrate an arrangement of elements calandered into a sheet according to a square relationship.
Figure 4A:
Figure 4B:

FIG. 4 illustrates a "square" arrangement of the "prints" formed on the sheet. For example round "prints" are arranged into alignments at right angles to each other. Multiple say twin strips (FIG. 4A) can be selectively broken off the material, or single strips (FIG. 4B).

Figure 5:
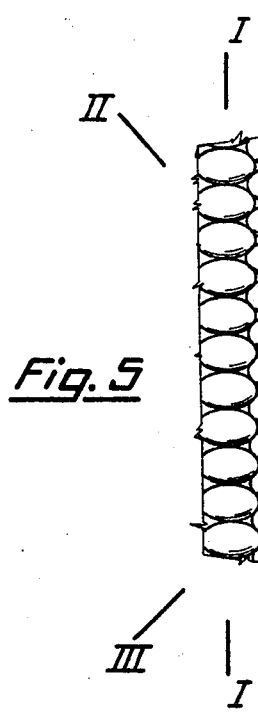
FIGS. 5 and 5A illustrate how from a sheet elaborated according to a quincunx arrangement an advantageous strip having a minimal of material and a maximal retroreflective efficiency can be produced.

A substantial saving of waste material can be obtained, as known by those skilled in the general art, by taking advantage of a quincunx arrangement (FIG. 5)

where the alignments intercross at regular angles different from 90 degrees, such in the alignments indicated at I—I, II—II and III—III.

Figure 5A:
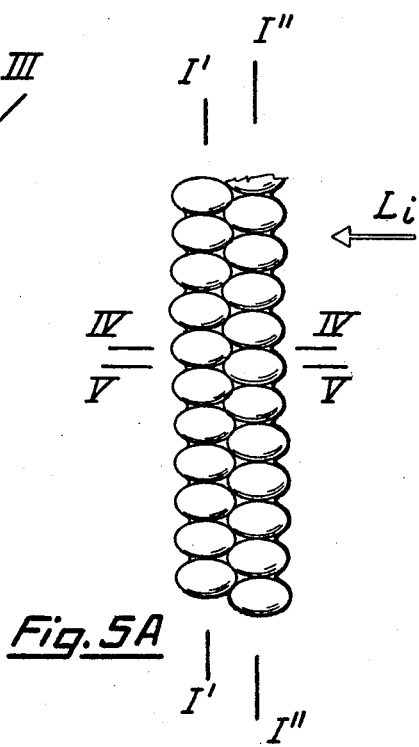

The prints can be elongated in plan view, so that elements which are both asymmetrical in vertical planes (see my U.S. Pat. No. 4,072,403) and in plan view are made. The calendered and brittle sheet also are broken into elements at will. FIG. 5A illustrates a very advantageous strip wherein pairs of columned elements along directions I'—I' and I"—I" intersect in pairs along lines IV—IV and V—V.

This arrangement has been proved of unexpected retroreflectiveness, because an impinging light beam in direction Li impinges on the tops of all elementary shapes and the length (at right angle with Li) of the strip is completely effective. Strips such as shown in FIG. 5A in the direction at right angle with the prevailing impinging rays or light, namely transversely to the roadway provide an exceptional reflection even if largely spaced.

The alignments IV—IV and V—V indicate the scaling of associated columns I'—I' and I"—I".

It will be understood that each of the elements described above, or two or more together, may also find a useful application in other types of constructions differing from the types described above.

While the invention has been illustrated and described as embodied in a retroreflective roadway surface and method of manufacturing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of manufacturing a retroreflective roadway pavement regulating sign of the type comprising retroreflectors adapted to reflect light beams impinged thereon by automobile carried source of light, comprising the steps of providing a primary planar material including a larger quantity of elementary retroreflectors; and forming from the primary planar material elementary retroreflective elements each including a a smaller quantity of the interconnected elementary retroreflectors each being elongated in plane view and asymmetrical in a vertical plane and the plane view.

2. A method defined in claim 1, wherein forming step includes forming each of the elementary retroreflective elements as a strip, with a plurality of the interconnected elementary retroreflectors.

3. A method as defined in claim 1, wherein said forming step includes forming each of the elementary retroreflective elements with a plurality of the interconnected elementary retroreflectors arranged in a single row.

4. A method as defined in claim 1, wherein said forming step includes forming each of the elementary retroreflective elements with a plurality of the elementary retroreflectors arranged in a plurality of parallel rows.

5. A method as defined in claim 1, wherein said forming step includes arranging of the elementary retroreflectors in a quincunx configuration.

6. A method as defined in claim 5, wherein said forming step includes arranging the elementary retroreflectors on a plurality of quincunx lines so that the elementary retroreflectors are in part interfitted in each other and interconnected to each other by a brittle thin sheet.

7. A method as defined in claim 5, wherein said forming step includes forming the elementary retroreflectors essentially elliptical in the plane defined by the quincunx arrangement.

8. A method defined in claim 1, wherein said forming step includes forming the elementary retroreflective elements as strips provided by subdividing said primary planar material, and forming the elementary retroreflectors by subdividing a respective strip into individual ones of the elementary retroreflectors.

9. A method as defined in claim 1, wherein said providing and forming steps include using outwardly convex retroreflectors in the primary planar material and in the retroreflective elements.

10. A method as defined in claim 1, wherein said forming step includes forming the elementary retroreflectors with an essentially elliptical configuration.

11. A retroreflective roadway pavement regulating sign of the type comprising retroreflectors adapted to reflect light beams which impinge thereon by automobile carried source of light, wherein at least a plurality of elementary retroreflective elements is selectively provided from a primary planar material including a larger quantity of elementary retroreflectors, each of said elements including a smaller quantity of the interconnected elementary retroreflectors, each of said elementary retroreflectors being elongated in plane view and asymmetrical in a vertical plane and the plane view.

12. A sign as defined in claim 11, wherein each of said elementary retroreflective elements is a strip, including a plurality of said interconnected elementary retroreflectors.

13. A sign as defined in claim 11, wherein each of said elementary retroreflective elements includes a plurality of said interconnected elementary retroreflectors arranged in a single row.

14. A sign as defined in claim 11, wherein each of said elementary retroreflective elements includes a plurality of said elementary retroreflectors arranged in a plurality of parallel rows.

15. A sign as defined in claim 11, wherein said elementary retroreflectors are arranged in a quincunx configuration.

16. A sign as defined in claim 15, wherein said elementary retroreflectors are located on a plurality of quincunx lines, said elementary retroreflectors being in part interfitted in each other and interconnected to each other by a brittle thin sheet.

17. A sign as defined in claim 15, wherein said elementary retroreflectors are essentially elliptical in the plane defined by the quincunx arrangements.

18. A sign as defined in claim 11, wherein said elementary retroreflective elements are formed as strips provided by subdividing said primary planar material, and said elementary retroreflectors are formed by subdividing a respective strip into individual ones of said elementary retroreflectors.

19. A retroflective roadway regulating sign as defined in claim 11, wherein said retroreflectors are outwardly convex retroreflectors both in said planar material and in said retroreflective elements.

20. A retroreflective roadway regulating sign as defined in claim 11, wherein said elementary retroreflectors have an essentially elliptical configuration.

* * * * *